US009524115B2

(12) United States Patent
Li-On et al.

(10) Patent No.: US 9,524,115 B2
(45) Date of Patent: *Dec. 20, 2016

(54) IMPERSONATING SCSI PORTS THROUGH AN INTERMEDIATE PROXY

(71) Applicant: INTERNATIONAL BUSINESS MACHINES CORPORATION, Armonk, NY (US)

(72) Inventors: Oren Li-On, Ramat-Gan (IL); Orit Nissan-Messing, Hod HaSharon (IL); Eyal Perek, Petach Tikva (IL); Ayelet Shani, Herev Le'et (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/005,106

(22) Filed: Jan. 25, 2016

(65) Prior Publication Data

US 2016/0139844 A1    May 19, 2016

Related U.S. Application Data

(63) Continuation of application No. 13/915,948, filed on Jun. 12, 2013, now Pat. No. 9,274,989.

(51) Int. Cl.
*G06F 3/06* (2006.01)
*G06F 13/38* (2006.01)

(52) U.S. Cl.
CPC .......... *G06F 3/0619* (2013.01); *G06F 3/0665* (2013.01); *G06F 3/0689* (2013.01); *G06F 13/385* (2013.01)

(58) Field of Classification Search
None
See application file for complete search history.

(56) References Cited

U.S. PATENT DOCUMENTS

| 6,209,023 | B1 | 3/2001 | Dimitroff et al. |
| 6,356,977 | B2 | 3/2002 | Ofek et al. |
| 6,400,730 | B1 | 6/2002 | Latif et al. |
| 6,405,294 | B1 | 6/2002 | Hayter |
| 6,557,048 | B1 | 4/2003 | Keller et al. |
| 6,718,402 | B1 | 4/2004 | Arroyo |

(Continued)

OTHER PUBLICATIONS

Bigang et al., "Design and Implementation of a Storage Virtualization System Based on SCSI Target Simulator in SAN," Tsinghua Science and Technology, v.10, n.1, p. 122-127.

*Primary Examiner* — Idriss N Alrobaye
*Assistant Examiner* — Dayton Lewis-Taylor
(74) *Attorney, Agent, or Firm* — Griffiths & Seaton PLLC (57) ABSTRACT

Methods, apparatus and computer program products implement embodiments of the present invention that include ascertaining, by a first storage system, a respective port identifier for each of one or more host ports defined to the first storage system for a logical volume stored on a second storage system. Examples of the port identifiers include WWPN and iSCSI iQN identifiers. A respective unique identifier is assigned to each of the ascertained one or more host ports, and for each of the one or more host ports, the respective port identifier and the assigned respective unique identifier are conveyed to the second storage system. Upon receiving, from one of the one or more host ports, an input/output (I/O) request for the logical volume, I/O request with the respective unique identifier of the one of the one or more host ports is conveyed to the second storage system.

18 Claims, 4 Drawing Sheets

(56) References Cited

U.S. PATENT DOCUMENTS

| | | |
|---|---|---|
| 6,915,354 B1 | 7/2005 | Ozdemir et al. |
| 6,922,761 B2 | 7/2005 | O'Connell et al. |
| 6,934,799 B2 | 8/2005 | Acharya et al. |
| 6,976,103 B1 | 12/2005 | Watanabe et al. |
| 7,103,712 B2 | 9/2006 | Mizuno |
| 7,173,929 B1 | 2/2007 | Testardi |
| 7,191,304 B1 | 3/2007 | Cameron et al. |
| 7,209,981 B1 | 4/2007 | Wade et al. |
| 7,321,925 B2 | 1/2008 | Trethewey |
| 7,340,639 B1 | 3/2008 | Lee et al. |
| 7,409,442 B2 | 8/2008 | Basham et al. |
| 7,577,169 B1 | 8/2009 | Dinh et al. |
| 7,594,024 B2 | 9/2009 | Shah et al. |
| 7,610,467 B2 | 10/2009 | Mimatsu et al. |
| 7,634,588 B2 | 12/2009 | Okada et al. |
| 7,640,408 B1 | 12/2009 | Halligan et al. |
| 7,668,981 B1 | 2/2010 | Nagineni et al. |
| 7,707,151 B1 | 4/2010 | Blumenau et al. |
| 7,757,055 B2 | 7/2010 | Tsukada et al. |
| 7,778,157 B1 | 8/2010 | Tawri et al. |
| 7,904,681 B1 | 3/2011 | Bappe et al. |
| 7,937,617 B1 | 5/2011 | Nagineni et al. |
| 8,028,110 B1 | 9/2011 | Wigmore |
| 8,060,710 B1 | 11/2011 | Don et al. |
| 8,086,896 B2 | 12/2011 | Allen et al. |
| 8,122,225 B2 | 2/2012 | Recio et al. |
| 8,160,070 B2 | 4/2012 | Dai et al. |
| 8,166,163 B2 | 4/2012 | Ma et al. |
| 8,230,187 B1 | 7/2012 | Krinke, II et al. |
| 8,254,388 B2 | 8/2012 | Kikuchi et al. |
| 8,270,420 B2 | 9/2012 | Wang et al. |
| 8,301,812 B1 | 10/2012 | Riordan et al. |
| 8,359,379 B1 | 1/2013 | Sen |
| 8,370,588 B2 | 2/2013 | Nakajima et al. |
| 8,380,852 B2 | 2/2013 | Allen et al. |
| 8,386,610 B2 | 2/2013 | Yahalom et al. |
| 8,417,895 B1 | 4/2013 | De La Iglesia |
| 8,429,446 B2 | 4/2013 | Hara et al. |
| 8,601,220 B1 | 12/2013 | Corbin et al. |
| 8,713,356 B1 | 4/2014 | Chan et al. |
| 8,819,317 B1 | 8/2014 | Li-On et al. |
| 8,904,050 B1 | 12/2014 | Raizen et al. |
| 2002/0071386 A1 | 6/2002 | Gronke |
| 2002/0073297 A1 | 6/2002 | Mizuno et al. |
| 2002/0193146 A1 | 12/2002 | Wallace et al. |
| 2002/0194407 A1 | 12/2002 | Kim |
| 2003/0067890 A1 | 4/2003 | Goel et al. |
| 2003/0212785 A1 | 11/2003 | Jibbe |
| 2005/0157730 A1 | 7/2005 | Grant et al. |
| 2005/0210144 A1 | 9/2005 | Kumagai et al. |
| 2006/0291392 A1 | 12/2006 | Alicherry et al. |
| 2008/0270564 A1 | 10/2008 | Rangegowda et al. |
| 2009/0037638 A1 | 2/2009 | Izuta et al. |
| 2009/0213736 A1 | 8/2009 | Liu et al. |
| 2009/0292834 A1 | 11/2009 | Neemidge et al. |
| 2010/0011114 A1 | 1/2010 | Thomas et al. |
| 2010/0070722 A1 | 3/2010 | Otani et al. |
| 2010/0161843 A1 | 6/2010 | Spry |
| 2010/0185794 A1 | 7/2010 | Belyakov et al. |
| 2010/0262772 A1 | 10/2010 | Mazina |
| 2011/0004707 A1 | 1/2011 | Spry et al. |
| 2011/0179414 A1 | 7/2011 | Goggin et al. |
| 2012/0137098 A1 | 5/2012 | Wang et al. |
| 2012/0221790 A1 | 8/2012 | Nunez et al. |
| 2012/0278280 A1 | 11/2012 | Broido et al. |
| 2012/0278572 A1 | 11/2012 | Broido et al. |
| 2013/0007364 A1 | 1/2013 | Xiong et al. |
| 2013/0046949 A1 | 2/2013 | Colgrove et al. |
| 2013/0067163 A1 | 3/2013 | Velayudhan et al. |
| 2013/0339647 A1 | 12/2013 | Jindo et al. |

IMPERSONATING SCSI PORTS THROUGH AN INTERMEDIATE PROXY

CROSS-REFERENCE TO RELATED APPLICATIONS

This application is a Continuation of U.S. patent application Ser. No. 13/915,948, filed on Jun. 12, 2013, which is related to U.S. patent applications titled "Load Balancing Input/Output Operations Between Two Computers", "Processing Input/Output Requests Using Proxy and Owner Storage Systems", "Safely Mapping and Unmapping of Host SCSI Volumes", "Unit Attention Processing in Proxy and Owner Storage Systems" and "Online Migration of a Logical Volume Between Storage Systems" filed on even date, and which are incorporated herein by reference.

FIELD OF THE INVENTION

The present invention relates generally to storage systems, and specifically to a storage facility configured to process input/output requests via a proxy storage system.

BACKGROUND

In a storage area network (SAN), remote computer storage devices such as disk arrays can be made accessible to host computers so that the storage devices appear as if they are locally attached to the host computer's operating system. SANs may be implemented using Small Computer System Interface (SCSI) storage devices, in which SCSI protocol entities perform input/output (I/O) operations (e.g., data reads and writes) and are exposed through a unique identifier such as a logical unit number (LUN) on a path. A given LUN typically corresponds to a logical volume, and may be represented within the host computer's operating system as a device. Interaction with a LUN is initiated by a SCSI initiator port on a host computer, which can issue various I/O request types to the LUN on a target data storage device.

The description above is presented as a general overview of related art in this field and should not be construed as an admission that any of the information it contains constitutes prior art against the present patent application.

SUMMARY

There is provided, in accordance with an embodiment of the present invention a method, including ascertaining, by a first storage system, a respective port identifier for each of one or more host ports defined to the first storage system for a logical volume stored on a second storage system, assigning a respective unique identifier to each of the ascertained one or more host ports, conveying, for each of the one or more host ports, the respective port identifier and the assigned respective unique identifier to the second storage system, and upon receiving, from one of the one or more host ports, an input/output (I/O) request for the logical volume, conveying, to the second storage system, the I/O request with the respective unique identifier of the one of the one or more host ports.

There is also provided, in accordance with an embodiment of the present invention a proxy storage system, including one or more proxy ports coupled to a storage area network (SAN), and a processor configured to ascertain a respective port identifier for each of one or more host ports defined to the proxy storage system for a logical volume stored on an owner storage system, to assign a respective unique identifier to each of the ascertained one or more host ports, to convey, for each of the one or more host ports, the respective port identifier and the assigned respective unique identifier to the owner storage system, and upon receiving, from one of the one or more host ports, an input/output (I/O) request for the logical volume via one of the one or more proxy ports, to convey, to the owner storage system, the I/O request with the respective unique identifier of the one of the one or more host ports.

There is further provided, in accordance with an embodiment of the present invention an owner storage system, including multiple owner ports configured to communicate with one or more proxy storage systems via a storage area network (SAN), a storage device configured to store a logical volume mapped on the one or more proxy storage systems to a host computer having multiple host ports, and a processor configured to receive configuration data from each of the one or more proxy storage systems, the configuration data comprising a port identifier and a respective unique identifier for each host port defined for each of the one or more proxy storage systems, subsequent to receiving the configuration data, to receive, from one of the one or more proxy storage systems, an input/output (I/O) request for the logical volume, the I/O request including a given unique identifier, and to ascertain, using the configuration data, one of the host ports that originated the I/O request.

BRIEF DESCRIPTION OF THE DRAWINGS

The disclosure is herein described, by way of example only, with reference to the accompanying drawings, wherein.

DETAILED DESCRIPTION OF EMBODIMENTS

There may be instances when a storage administrator wants to migrate a logical volume from a first storage system to a second storage system in order to balance the storage utilization across the storage systems. During the migration, after copying the logical volume to the second storage system, the first storage system can be configured as a proxy for the logical volume that is now stored on the second storage system, thereby enabling the first storage system to continue to receive and process input/output (I/O) requests for the logical volume. In embodiments described herein the first storage system may also be referred to as a proxy storage controller and the second storage system may also be referred to as an owner storage controller, wherein the proxy and the owner storage controllers comprise Small Computer System Interface (SCSI) based storage systems.

When a proxy storage controller forwards an I/O request from a host computer to an owner storage controller (the forwarded I/O request may also be referred to herein as a proxy I/O request), an initiator port on the host computer needs to be impersonated because SCSI reservations function based on a source port. Additionally, the host computer may communicate with the proxy storage controller over a first network fabric that is independent from a second network fabric that the proxy storage controller uses to communicate with the owner storage controller.

Embodiments of the present invention provide methods and systems for an owner storage controller to receive a proxy I/O request from the proxy storage controller and identify a port on a host computer that initiated the I/O request. As explained hereinbelow, the owner storage controller may maintain a global port table, and upon receiving a proxy I/O request, the owner storage controller can identify, using data stored in the global port table, the port on a host computer that initiated the I/O request.

In some embodiments, the owner storage controller can maintain a database of volume reservations and keys. Therefore, embodiments of the present invention maintain volume reservation integrity while processing I/O requests from host computers that are communicating with the owner storage controllers either directly or via a proxy storage controller.

Figure 1:
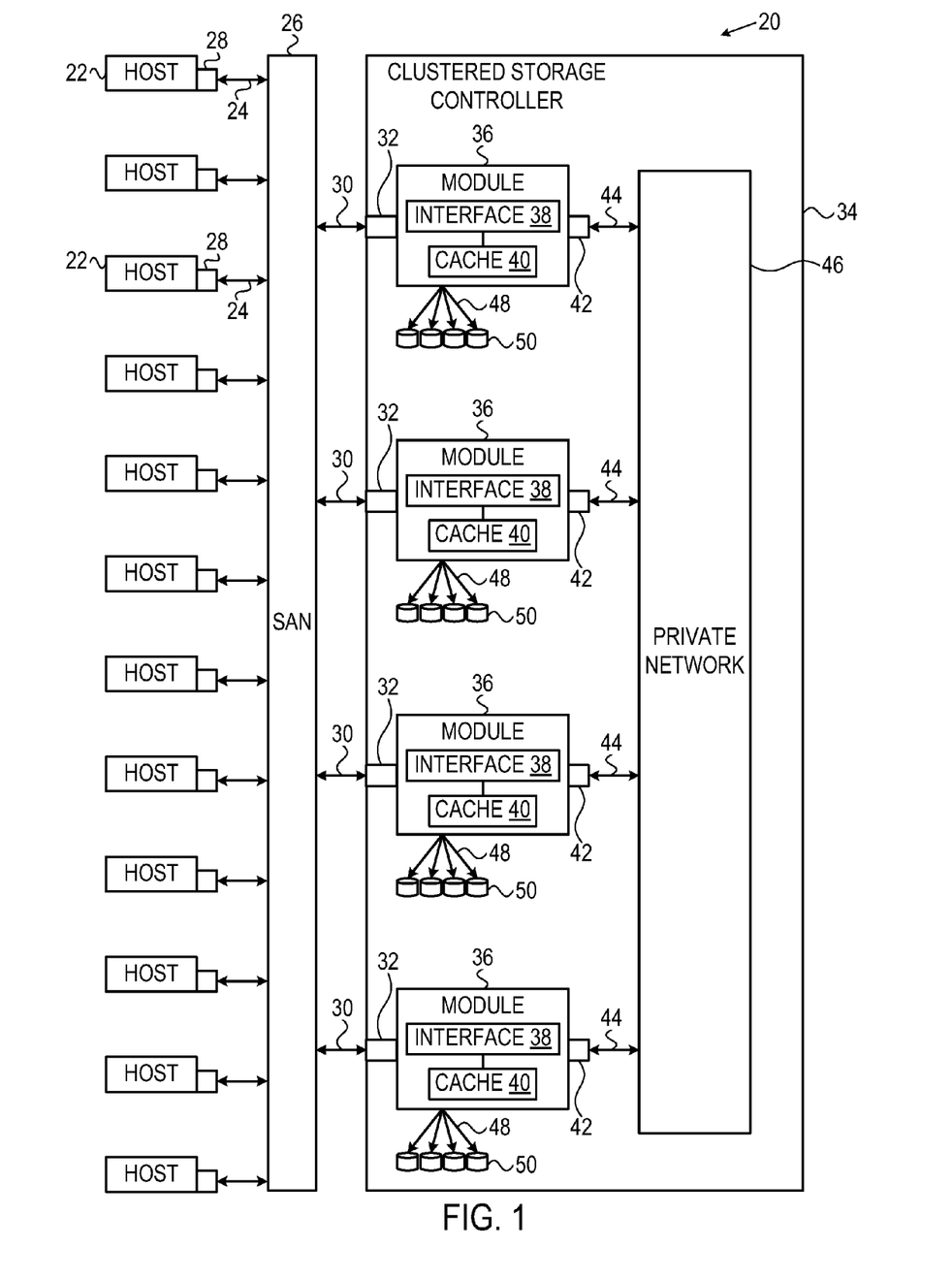
FIG. 1 is a block diagram that schematically illustrates a storage system, in accordance with an embodiment of the present invention.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

Examples of adapters 32 and 42 include switched fabric adapters such as Fibre Channel (FC) adapters, Internet Small Computer System Interface (iSCSI) adapters, Fibre Channel over Ethernet (FCoE) adapters and Infiniband™ adapters.

Figure 2:
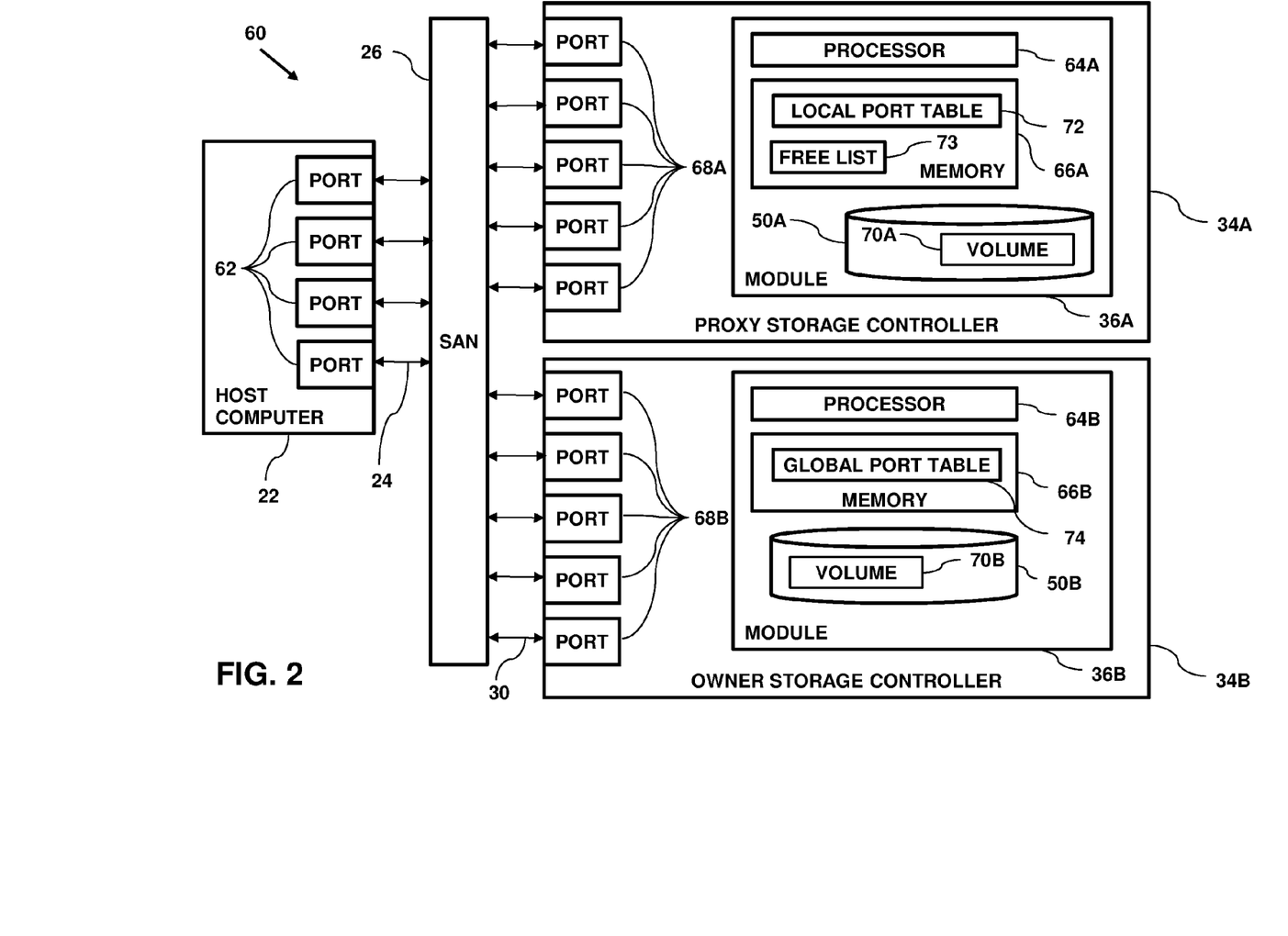
FIG. 2 is a block diagram of a facility comprising multiple storage systems configured to impersonate a host port through an intermediate proxy, in accordance with an embodiment of the present invention.

FIG. 2 is a block diagram of a facility 60 configured to process proxy input/output requests, in accordance with an embodiment of the present invention. In the description herein, storage controllers 34 and their respective components may be differentiated by appending a letter to the identifying numeral, so that facility 60 comprises host computer 22 and storage controllers 34A and 34B that are configured to communicate with each other via SAN 26. In embodiments herein, storage controller 34A may also be referred to as a first storage controller 34 or as a proxy storage controller 34, and storage controller 34B may also be referred to as a second storage controller 34 or an owner storage controller 34.

Host computer 22 communicates with SAN 26 via ports 62. Module 36 comprises a processor 64 and a memory 66, and communicates with SAN 26 via ports 68. In some embodiments ports 62 and 68 may comprise SCSI ports, and the SCSI ports may be configured within module 36. In embodiments herein, ports 68A may also be referred to as proxy ports and ports 68B may also be referred to as owner ports.

While for purposes of illustrative simplicity, the configuration in FIG. 2 shows module 36 comprising a single storage device 50 storing a single logical volume 70, module 36 typically comprises multiple storage devices 50 storing multiple logical volumes 70. Additionally, a given logical volume 70 may be stored across multiple storage devices 50 in a given storage controller 34.

Processor 64A maintains, in memory 66A, a local port table 72 that stores a port identifier for each of each host port 62 in communication with processor 64A. For example, the port identifier may comprise a World Wide Port Name (WWPN) for a SCSI port, or an Internet Small Computer System Interface (iSCSI) Qualified Name (iQN). Additionally, while the example in FIG. 2 shows a single host computer 22, local port table 72 may store entries for ports 62 of multiple host computers 22. Each entry in local port table 72 also comprises a respective unique identifier. Therefore, each entry in host table 72 comprises a given port identifier and the respective unique identifier for a given port 68A.

In some embodiments, processor 64A also maintains, in memory 66A, a free list 73. As explained hereinbelow, free list 73 comprises a list of multiple available unique identifiers that processor 64A can assign to each entry in port table 72. The unique identifiers are unique to a given proxy storage controller 34A. In configurations comprising multiple proxy storage controllers 34A, a given proxy storage controller maintains a respective free list 73 having unique identifiers local to given proxy storage controller. In other words a first free list 73 in a first proxy storage controller 34A may have a first unique identifier identical to a second unique identifier of a second free list 73 of a second proxy storage controller 34A.

As explained hereinbelow, upon receiving, from a given port 68A, an I/O request for logical volume 70B (i.e., on storage controller 34B), processor 64A can locate, in local port table 72, the respective unique identifier for the given host port 62, and include the respective unique identifier in the I/O request forwarded to owner storage controller 34B.

Processor 64B maintains, in memory 66B, a global port table 74, that stores a list of all known host ports 62 in communication with processor 64B, either directly or via a given proxy storage controller 34A. In some embodiments, processor 64B can communicate with processor 64A and populate global table 74 with data stored in local port table 72. Therefore, each entry in global port table 74 may comprise a proxy identifier, a given port identifier and the respective unique identifier for a given proxy, where the proxy identifier references the given proxy storage controller 34A that communicates directly with a given host port 62 referenced by the given port identifier.

In operation, upon processor 68B receiving, from a given proxy storage controller 34A, an I/O request initiated from a given host port 62, the I/O request including a unique identifier, processor 64B can query global port table 74, using the given proxy storage controller and the received unique identifier as keys, in order to identify the given host port that initiated the I/O request. Since the port identifier may comprise a string of up to 255 bytes, including the respective unique identifier can reduce a payload size of a given I/O request forwarded to the owner storage controller, thereby reducing search time in tables on the owner.

In some embodiments, processor 64A can synchronize the following information between proxy storage controller 34A and owner storage controller 34B:

A current list of host ports 62 defined to (i.e., in communication with) processor 64A. Upon detecting a change in the host ports to the proxy storage controller (e.g., identifying a new host port 62 in communication with the proxy storage controller), processor 64A can update local port table 72 and convey the update to owner storage controller 34B. Upon receiving the update, owner storage controller 34 can update global port table 74 accordingly.

Host mapping information. For each host port 62, processor 64A can update local port table 72 to indicate which logical volumes 70 are present in the LUN mapping.

Login information. Processor 64A can update local port table 72 to track a count of logins from each host port 62.

Processor 64 typically comprises a general-purpose central processing unit (CPU), which is programmed in software to carry out the functions described herein. The software may be downloaded to module 36 in electronic form, over a network, for example, or it may be provided on non-transitory tangible media, such as optical, magnetic or electronic memory media. Alternatively, some or all of the functions of processor 64 may be carried out by dedicated or programmable digital hardware components, or using a combination of hardware and software elements.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Python, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/actions specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the functions/actions specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/actions specified in the flowchart and/or block diagram block or blocks.

HOST PORT IDENTIFICATION

In embodiments of the present invention, storage controller 34A system can be configured as a proxy for logical volume 70B that is stored on the storage controller 34B. In operation, volume 70B is mapped on storage controller 34A to host computer 22, even though volume 70B is physically stored on storage controller 34B.

Figure 3:
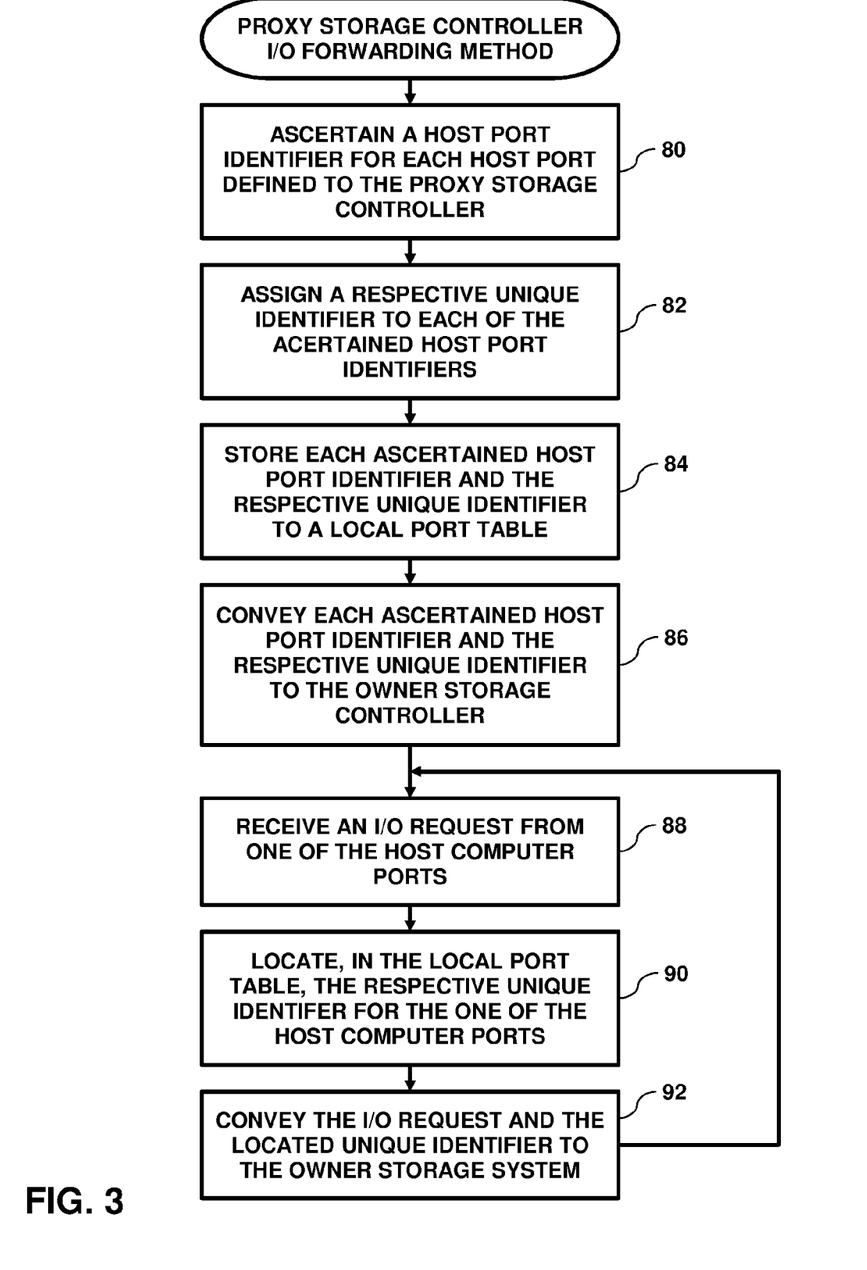
FIG. 3 is a flow diagram that schematically illustrates a method for a proxy storage controller to forward a proxy input/output (I/O) request from a host computer to an owner storage controller, in accordance with an embodiment of the present invention.

FIG. 3 is a flow diagram that schematically illustrates a method for storage controller 34A to process a proxy I/O request received from host computer 22, in accordance with an embodiment of the present invention. In an initial step 80, processor 64A detects all host ports 62 defined to proxy storage controller 34A for logical volume 70B, and ascertains a respective port identifier for each of the detected host ports.

In an assignment step 82, processor 64A assigns a respective unique identifier to each of the ascertained host ports 62. As described supra, processor 64A can assign a current the respective unique identifier by retrieving an entry from free list 73.

In a store step 84, processor 64A populates local port table 72 by storing each ascertained port identifier and the respective unique identifier to an entry in the host port table, so that each entry in the local port table stores a given one of the ascertained port identifiers and the respective unique identifier. In a first convey step 86, processor 64A conveys each of the ascertained port identifiers and the respective unique identifiers to the owner storage controller.

In operation, steps 84 and 86 can be repeated upon detecting any changes to the host ports defined to (i.e., mapped to) proxy computer 34A. For example, processor 64A can detect a new host port 62 has been mapped on proxy storage controller 34A or can detect that a given host port 62 has been unmapped from the proxy storage controller.

In a receive step 88, processor 64A receives an I/O request for volume 70B from a given host port 22, via a given proxy port 68A. Examples of I/O requests include, but are not limited to request to read data from logical volume 70B and a request to write data to logical volume 70B. In a locate step 90, processor 64A locates the entry in local port table 72 for the given host port (i.e., the entry storing the respective port identifier for the given host port), and retrieves the respective unique identifier from the located entry. Finally, in a second convey step 92, processor 64A conveys the I/O request and the retrieved respective unique identifier to owner storage controller 34B and the method returns to step 88.

Figure 4:
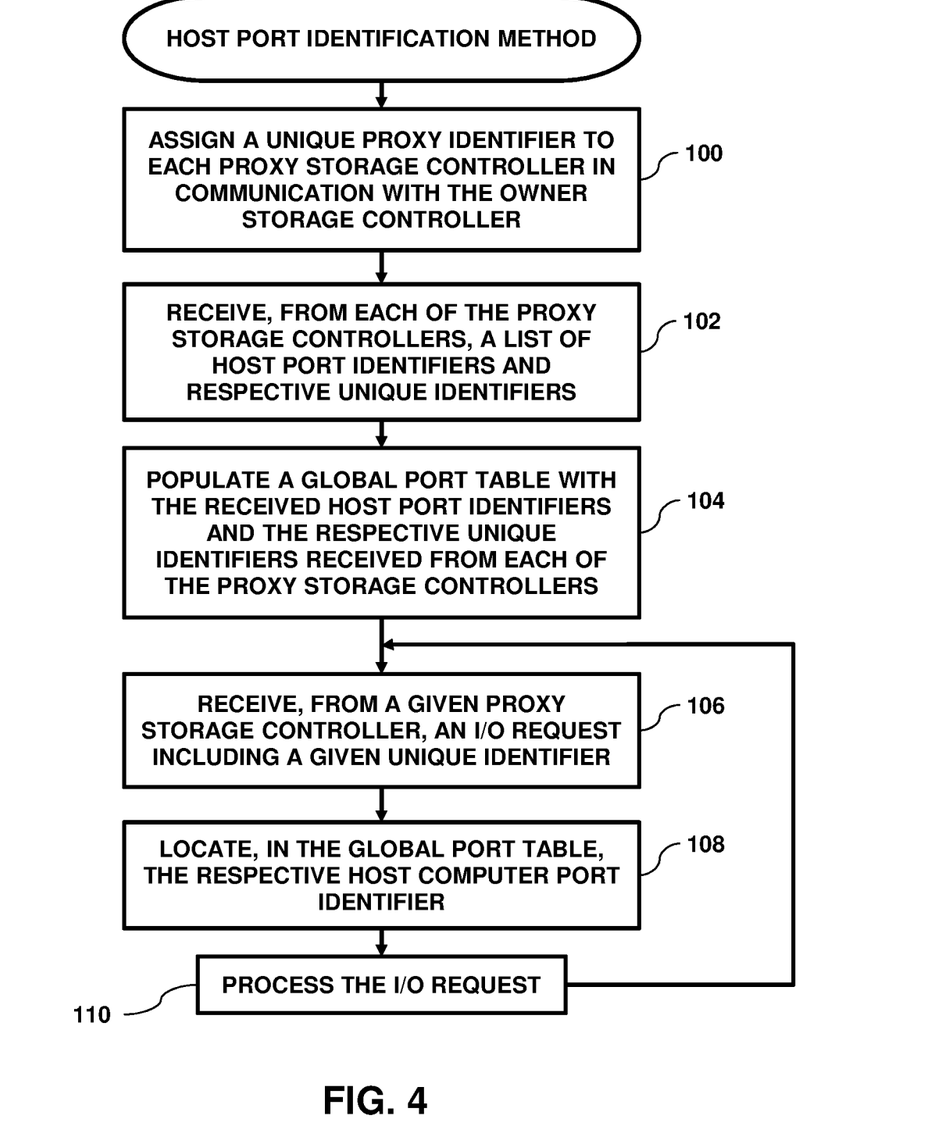
FIG. 4 is a flow diagram that schematically illustrates a method for an owner storage controller to identify a host computer port, in accordance with an embodiment of the present invention.

FIG. 4 is a flow diagram that schematically illustrates a method for owner storage controller 34V to identify a host computer port 62 for a proxy I/O request received from proxy storage controller 34A, in accordance with an embodiment of the present invention. In embodiments described in FIG. 4, volume 70B is mapped on proxy storage controller 34A to host computer 22.

In an assignment step 100, processor 64B identifies one or more proxy storage controllers in communication with processor 64B, and assigns a unique proxy identifier to each of the identified proxy storage controllers. In a first receive step 102, processor 64B receives, from each of the identified proxy storage controllers, configuration data comprising a list of port identifiers and a respective unique identifier for each of the port identifiers. For the list received from a given proxy storage controller 34A, the list of port identifiers may comprise the port identifiers ascertained in step 80, as described hereinabove.

In a populate step 104, processor 64B global port table 74 with the received configuration data. Each entry of global port table can also indicate the proxy storage controller that conveyed the list. Upon completing step 104, each host port 62 and proxy storage controller 34A has a unique entry in the array, thereby enabling processor 64B to identify a given port identifier, via a tuple comprising a given host port 62 and a given proxy storage controller 34A.

As described supra, the respective unique identifier can reduce the payload size of a given I/O request forwarded to the owner storage controller. In some embodiments, processor 64B can assign a unique global identifier to each of the tuples. The unique global identifier can be used in all SCSI tables (e.g., a SCSI reservation table) stored in any owner storage controller 34B in facility 60, thereby reducing communications traffic.

In a second receive step 106, processor 64B receives, from a given proxy storage controller 34A, a proxy I/O request for logical volume 70B, the proxy I/O request including a given unique identifier. In a locate step 108, processor 64B can locate an entry in the global port table storing the respective port identifier for the given proxy storage controller 34B (i.e., the proxy storage controller that conveyed the I/O request) and the received unique identifier. In other words, using the received unique identifier and the unique proxy identifier of the proxy storage controller that conveyed the I/O request, processor 64B can identify the host port (and thereby the host computer) that originated the I/O request. Finally, in a processing step 110, processor 64B processes the received proxy I/O request, conveys a result of the processed I/O request to the proxy storage controller, and the method returns to step 106.

Upon identifying the host computer that originated the proxy I/O request using embodiments described supra, processor 64B can verify if the identified host computer is eligible to process the I/O request. For example, processor 64B may detect that volume 70B has been reserved by a different host computer 22.

In embodiments of the present invention, the given host computer can be mapped to logical volume 70B via a mapped connection between the given host computer and the proxy storage controller or a mapped connection between the given host computer and the owner storage controller. In SCSI-2, a non-persistent reservation comprises a reservation for a given volume 70 that can be cleared upon the given volume being "non-reachable" from any host port 62 that has reserved the given volume. A given host port 62 that has reserved a given volume 70 is also known as a "reserver port". As described supra, processor 64B can also be configured to synchronize host mapping information and login information with processor 64B. Therefore, if a given host computer 22 has a non-persistent reservation on volume 70B and processor 64B detects zero logins from host ports 62 (i.e., the reserver ports) to volume 70B, processor 64B can cancel the non-persistent reservation.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:
1. A method, comprising:
ascertaining, by a first storage system, a respective port identifier for each of one or more host ports defined to the first storage system for a logical volume stored on a second storage system;
assigning a respective unique identifier to each of the ascertained one or more host ports;
conveying, for each of the one or more host ports, the respective port identifier and the assigned respective unique identifier to the second storage system; and
upon receiving, from one of the one or more host ports, an input/output (I/O) request for the logical volume, conveying, to the second storage system, the I/O request with the respective unique identifier of the one of the one or more host ports;
wherein a mapping is selected from a list comprising a mapped connection between a host computer and the first storage system, and a mapped connection between the host computer and the second storage system; and wherein the logical volume has a non-persistent reservation from the second storage system, and comprising releasing the non-persistent reservation in response to detecting zero logins from any of the one or more host ports to the logical volume.

2. The method according to claim 1, wherein the I/O request is selected from a list comprising a request to read data from the logical volume and a request to write data to the logical volume.

3. The method according to claim 1, wherein the respective port identifier is selected from a list comprising a World Wide Port Name and an Internet Small Computer System Interface Qualified Name.

4. The method according to claim 1, wherein assigning the unique identifier comprises retrieving the unique identifier from a free list comprising a list of identifiers that are unique to a storage controller and are available to be assigned to the ascertained one or more host ports.

5. The method according to claim 1, and comprising populating a local port table with each of the ascertained port identifiers and the respective unique identifiers, each entry in the local port table storing one of the ascertained port identifiers and the respective unique identifier.

6. The method according to claim 5, wherein conveying the assigned respective unique identifier comprises locating an entry in the local port table, storing the respective port identifier for the one of the one or more host ports, and conveying the respective unique identifier stored in the located entry.

7. A proxy storage system, comprising:
one or more proxy ports coupled to a storage area network (SAN); and
a processor configured:
to ascertain a respective port identifier for each of one or more host ports defined to the proxy storage system for a logical volume stored on an owner storage system,
to assign a respective unique identifier to each of the ascertained one or more host ports,
to convey, for each of the one or more host ports, the respective port identifier and the assigned respective unique identifier to the owner storage system, and
upon receiving, from one of the one or more host ports, an input/output (I/O) request for the logical volume via one of the one or more proxy ports, to convey, to the owner storage system, the I/O request with the respective unique identifier of the one of the one or more host ports;
wherein the mapping is selected from a list comprising a mapped connection between a host computer and the proxy storage system, and a mapped connection between the host computer and the owner storage system; and wherein the logical volume has a non-persistent reservation from the owner storage system, and comprising releasing the non-persistent reservation in response to detecting zero logins from any of the one or more host ports to the logical volume.

8. The proxy storage system according to claim 7, wherein the I/O request is selected from a list comprising a request to read data from the logical volume and a request to write data to the logical volume.

9. The proxy storage system according to claim 7, wherein the port identifiers are selected from a list comprising a World Wide Port Name and an Internet Small Computer System Interface Qualified Name.

10. The proxy storage system according to claim 7, and comprising a memory configured to store a free list comprising a list of identifiers that are unique to a storage controller and are available to be assigned to the ascertained one or more host ports, and wherein the processor is configured to assign the respective unique identifier by retrieving the respective unique identifier from the free list.

11. The proxy storage system according to claim 7, wherein the processor is configured to populate a local port table with each of the ascertained port identifiers and the respective unique identifiers, each entry in the local port table storing one of the ascertained port identifiers and the respective unique identifier.

12. The proxy storage system according to claim 11, wherein the processor is configured to convey the assigned respective unique identifier by locating an entry in the local port table storing the respective port identifier for the one of the one or more host ports, and conveying the respective unique identifier stored in the located entry.

13. An owner storage system, comprising:
multiple owner ports configured to communicate with one or more proxy storage systems via a storage area network (SAN);
a storage device configured to store a logical volume mapped on the one or more proxy storage systems to a host computer having multiple host ports; and
a processor configured:
to receive configuration data from each of the one or more proxy storage systems, the configuration data comprising a port identifier and a respective unique identifier for each host port defined for each of the one or more proxy storage systems,
subsequent to receiving the configuration data, to receive, from one of the one or more proxy storage systems, an input/output (I/O) request for the logical volume, the I/O request including a given unique identifier, and
to ascertain, using the configuration data, one of the host ports that originated the I/O request;
wherein the mapping is selected from a list comprising a mapped connection between the host computer and the proxy storage system, and a mapped connection between the host computer and the owner storage system; and wherein the logical volume has a non-persistent reservation from the host computer, and comprising releasing the non-persistent reservation in response to detecting zero logins from any of the multiple host ports to the logical volume.

14. The owner storage system according to claim 13, wherein upon verifying an availability of the logical volume, the processor is configured to process the I/O request, and to convey a result of the I/O request to the one of the one or more proxy storage systems.

15. The owner storage system according to claim 13, wherein the I/O request is selected from a list comprising a request to read data from the logical volume and a request to write data to the logical volume.

16. The owner storage system according to claim 13, wherein the port identifiers are selected from a list comprising a World Wide Port Name and an Internet Small Computer System Interface Qualified Name.

17. The owner storage system according to claim 13, wherein upon receiving the configuration, the processor is configured to populate a global port table with the configuration data.

18. The owner storage system according to claim 13, wherein the processor is configured to ascertain the one of the host ports by locating an entry in the global port table storing the respective port identifier for the one of the one or more proxy storage system and the received unique identifier.

* * * * *